United States Patent Office 3,053,102
Patented Sept. 11, 1962

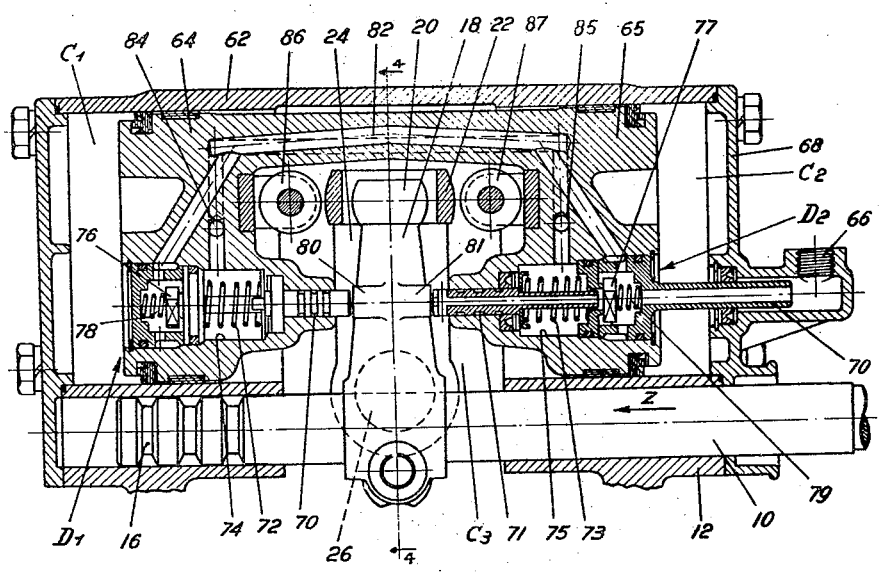
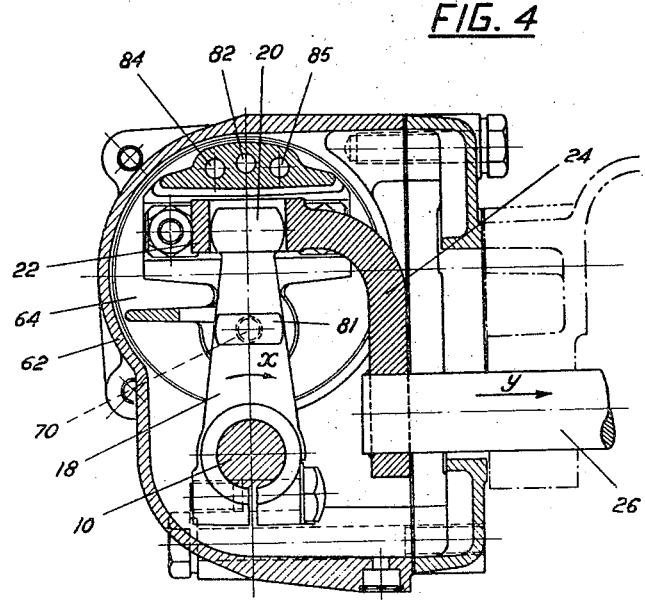

3,053,102
TRANSMISSION WITH A PNEUMATIC-MECHANICAL SERVOCONTROL
Giuseppe Alfieri, Milan, Italy, assignor to Fabbrica Italiana Magneti Marelli S.p.A., Milan Italy, a firm
Filed July 9, 1959, Ser. No. 825,929
Claims priority, application Italy July 16, 1958
6 Claims. (Cl. 74—335)

This invention relates to transmission, wherein the control operation is carried out by hand and by an auxiliary force produced by a servocontrol device, that consists substantially in a double-acting cylinder and two pressure air distributors.

As it is well known, operation of a mechanical transmission comprises a rotary movement and a translation movement of a driving member connected to the gear lever and in connection therewith a translation motion and a rotary movement of the operation member of the gear coupling and release selection unit.

In a conventional mechanical gearbox transmission of two motions of the driving member to the gear operation member is always carried out in a mechanical way by means of a connecting arm provided with a ball joint.

In a gearbox or transmission as driven by an auxiliary servocontrol, the lever system connecting said members is embodied in such a way that only a mechanical transmission of the effort-causing a rotary movement of the driving member (gear selection step)—to the operation member takes place, whereas the axial motion of said driving member causes operation of the servocontrol that aids the initial hand effort as applied to the gear lever. The auxiliary action of the servocontrol device makes possible a considerable reduction in the force which the driver must exert on the gear lever, to carry out coupling or release of the required gear.

There are a number of methods for using a servocontrol in connection with a transmission or gear shift. The embodiments of such methods comprise however, as it is well known, special and cumbersome operating devices all involving high friction resistance and excessive wear caused by opening the air distributors of the servocontrol mechanism.

It is an object of the present invention to provide a new and simple pneumatic servocontrol mechanism that can be fitted to the gearbox without particular alteration of the usual connection between the driving member and the operating member of the gear unit. As a result the driving member and the operating member, and their connection, may be constructed and operated substantially as heretofore. Furthermore, by employing the present invention, the manufacturer may economically produce—without appreciable structure alteration—vehicles having either the usual transmission or vehicles which also have an auxiliary servocontrol.

The invention contemplates a transmission control in which rotary movement of the driving member, effected by the gear lever, constantly acts upon the member which selectively couples and releases the gears. On the other hand, axial movement of the driving member initiates action of the auxiliary servocontrol to rotate the member which selectively couples and releases the gears.

According to the present invention, a control rod has rigidly fixed thereto an arm extending radially therefrom which is suitably connected to a member which selectively couples and releases the gears. Rotary movement of the control rod causes axial movement of the gear selection member. Axial movement of the control rod causes rotary motion of the gear selection member for engaging the gears selectively, initiating the action of the auxiliary servocontrol which effects engagement of the gears by the gear selection member.

Further features and details of the invention will be described with reference to the accompanying drawings, of which:

FIG. 3 is a longitudinal cross-sectional view of the pneumatic servo-control device shown in FIG. 1; and FIG. 4 is a sectional view of the pneumatic servo-control device taken along line 4—4 of FIG. 3.

Figure 1:
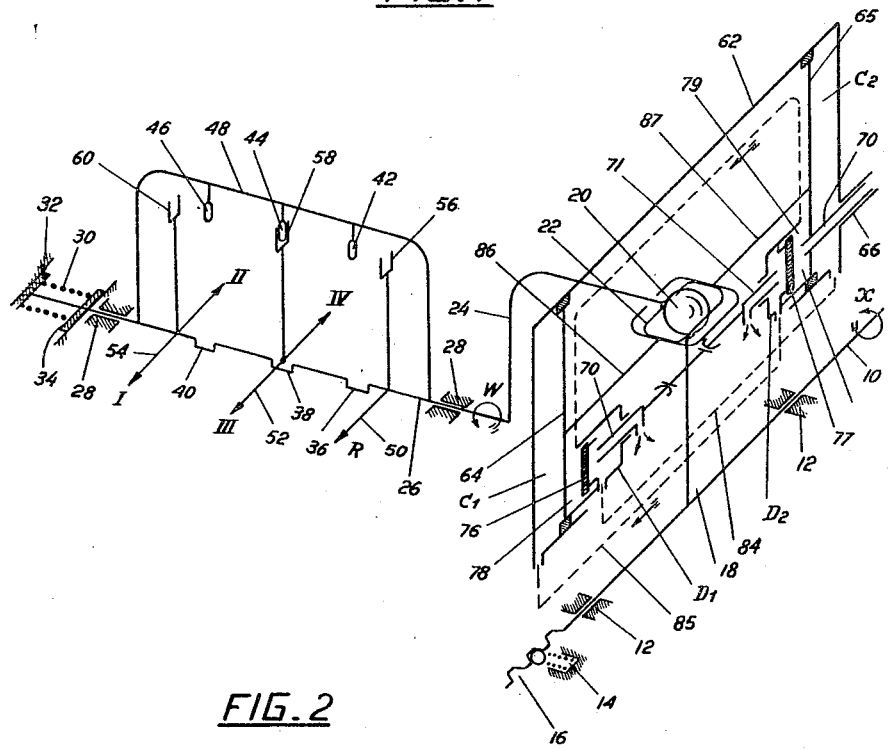
FIGURE 1 is a diagrammatic perspective view of a pneumatic servo-control device according to the present invention as applied to a mechanical transmission.
Figure 2:
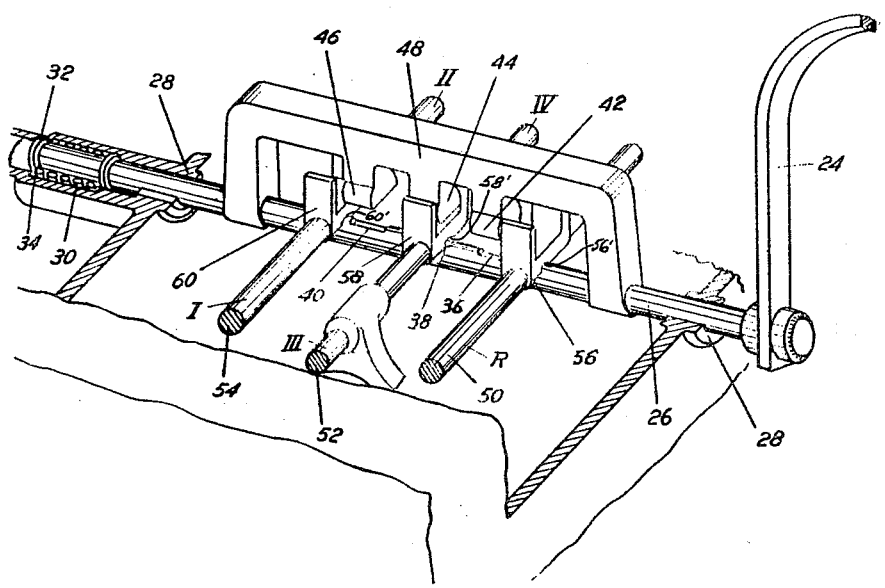
FIG. 2 is a perspective, detail view, partially in section of the mechanical transmission shown in FIG. 1.

Referring to the drawings, and more particularly to FIGURES 1 and 3, the pneumatic servo-control device comprises a control rod 10, operatively connected to a gear shift lever (not shown); said control rod being carried by bearings 12 which allow the rod to be rotated and displaced. Suitable detent means 14 is provided for engaging one of a plurality of annular grooves 16 formed in the rod 10 for holding said rod in a selected axial position. An arm 18 is rigidly connected to the rod 10 and extends at a right angle thereto, the arm being provided with a spherical head 20 at its free end, said head being housed between the arms of a frame strap 22. The strap 22 is provided with a rectangular contour such that its width (FIG. 4) corresponds to the diameter of the spherical head 20 and its length (FIG. 3) is greater than the diameter of the head, thereby forming a lost motion connection between the arm 18 and the strap 22. A suitable crank arm 24 is integrally fixed at one end to the strap 22 and at the other end to a shaft 26 (FIGS. 1 and 2); said shaft forming the conventional operating member for actuating the selective gear coupling and release unit, is held by supports 28 so as to be capable of oscillating about and sliding along its longitudinal axis. The free end of the shaft 26 is provided with a coil spring 30 which cooperates with rings 32 fixed to the shaft and washer 34 slidably mounted on the shaft whereby the spring 30 holds the shaft 26 in a predetermined axial position. Tangential slots 36, 38 and 40 are formed on shaft 26 and corresponding pawls 42, 44 and 46, the number of which depends upon the number of gears in the gear box, are aligned on a fork 48 having its arms fixed to the shaft 26. In the illustrated embodiment, the gear box has four forward speeds I, II, III and IV, and a position of reverse motion R, whereby three rods 50, 52 and 54 cooperate with the shaft 26 to actuate the gears in the gear box; said rods being rigidly secured to forks 56, 58 and 60, respectively, said forks being arranged in such a manner that when one of them engages its respective pawl, the remaining forks are disengaged. As will be seen in FIG. 2, each of the forks 56, 58 and 60 are provided with grooves 56', 58' and 60', respectively, adapted to slidably engage the peripheral surface of the shaft 26 or to be seated in one of the slots 36, 38 and 40 so that, if one of the fork grooves is seated in one of the slots, the associated rod will move in a direction along its longitudinal axis when the fork 48 and shaft 26 are rotated, while the other rods and associated forks remain stationary, since the shaft 26 rotates relative thereto.

As will be seen in FIGURE 3, the transverse sides of the strap 22 are arcuately-shaped to cooperate with a servo-control device comprising, a cylinder 62 having a double plunger 64, 65 slidably mounted therein, thereby defining two opposite chambers $C_1$ and $C_2$ in the cylinder. The chambers are supplied with compressed air from a source, through a coupling 66 formed in one of the covers 68 of the cylinder, the coupling 66 being pneumatically connected through a telescopic member 70$_a$ to two distributors D$_1$ and D$_2$ positioned within plungers 64 and 65, respectively. The respective distributors D$_1$ and D$_2$ comprise axially bored push rods 70, 71 having springs 72, 73, the ends of the push rods being positioned in chambers 74, 75 formed within the plungers 64, 65. The ends of the push rods 70, 71 are adapted to engage check valves 76, 77 for controlling the flow of compressed air between the chambers 74, 75 and adjacent chambers 78, 79 formed in the plungers 64 and 65, respectively. The push rods 70, 71 are coaxial and have an arm 18 positioned therebetween, said arm having projections 80 and 81 adapted to alternately engage the free ends of push rods 70, 71, respectively. The chambers 78 and 79 are connected to the compressed air coupling 66 through telescopic member 70$_a$ and a conduit 82 formed in the double plunger 64, 65, the chambers 74, 75 being connected to the chambers C$_2$ and C$_1$, respectively, through conduits 84 and 85, formed in the double plunger, parallel and adjacent to the conduit 82 (FIGS. 3 and 4). Under normal conditions the chambers C$_1$ and C$_2$ are connected to the atmosphere through the passages in push rods 70, 71 which open into a chamber C$_3$ formed in the cylinder 62. The arcuate portions of strap 22, as described hereinafter, are adapted to cooperate with a pair of rollers 86 and 87 pivotally mounted on the double plunger 64, 65.

In operation, the operator preselects the desired speed gear by manually rotating rod 10 in one direction or another, thereby sliding the shaft 26 along its longitudinal axis to engage one of the pawls 42, 44 and 46 with its respective fork 56, 58 and 60. During this step, the servo-control device remains inoperative and the gear selection is manually accomplished. After the desired speed gear has been selected, assuming the driver moves the rod 10 in an axial direction Z (FIG. 3), the projection 80 on arm 18 engages the push rod 70 of distributor D$_1$, thereby displacing the push rod in an axial direction to interrupt the communication of chambers 74 and C$_2$ with the atmosphere and to move valve 76 away from its seat. During this phase of the operation, the arm 24 does not oscillate due to the lost-motion connection between the spherical head 20 and the strap 22. Once the valve 76 is opened, air under pressure from coupling 66, chamber 79, conduit 82 and chamber 78, flows into chamber 74, conduit 84, and into chamber C$_2$, thus displacing the double plunger 64, 65 in the axial direction Z (FIG. 3). After the valve 76 has been opened, the driver releases the control rod 10, which is held in a desired position by the detent means 14, and the double plunger 64, 65 continues to be displaced by the air pressure in chamber C$_2$. As the double plunger is displaced, the roller 87, carried by the double plunger engages the strap 22 whereby the arm 24 is oscillated in the direction of arrow W (FIG. 1), to thereby move one of the rods 50, 52 and 54 in a direction along its longitudinal axis to actuate one of the selected gears in the gear box. After the double plunger has been displaced a sufficient distance, the push rod 70 becomes disengaged from the projection 80, the check valve 76 closes and the chambers 74 and C$_2$ are once again placed into communication with the atmosphere.

In order to engage another speed gear, the driver acts again on rod 10 to move it in a direction opposite to the arrow Z, whereby the projection 81 on arm 18 engages the push rod 71, thereby opening valve 77 so that pressurized air flows from chamber 79 into chamber 75, and from the latter through conduit 85, into chamber C$_1$, to thus force the double plunger in a direction opposite to the arrow Z (FIG. 3) whereby one of the rods 50, 52, 54 and its associated fork 56, 58, 60 is returned to a neutral position as shown in FIGURE 1. Thereafter the driver may rotate the rod 10 thereby moving it to a desired angular position and then axially move the rod 10 and shaft 26 to preselect the desired gear speed.

From the above description, it will be readily seen that the manual action of the driver is limited to that necessary for actuating either one or the other distributor D$_1$ or D$_2$. If the supply of pressurized air for the servo-control device should fail, the manual control rod 10, through arm 18, ball 20 and strap 22 can be used to actuate shaft 26.

The detent means 14, as described hereinabove, holds the rod 10 and ball 20 in a neutral position, as shown in FIGURES 1 and 3, even when a speed gear is engaged; hence, after the control movement, the neutral position of the rod 10 may be reset. Thus, the servo-control device has the advantage of being under pressure only during the actuation of the gear box. The cycle of the actuation of the gear is the same for the engagement of the first, second, third, fourth and reverse speed gears, as well as the disengagement of any one of said speed gears.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A transmission control comprising a control rod movable axially and rotationally about its axis, an arm rigidly connected to said control rod and extending radially therefrom, a gear coupling operation member movable axially and rotationally about its axis, a crank having one leg fixed to an end of said operation member extending at right angles thereto and the other leg extending parallel to said operation member, and a compound lost motion and universal connection between said arm and the leg of said crank extending parallel to said operation member, in combination with a servocontrol mechanism operable in a direction parallel to the axis of said control rod, said mechanism having valves the stems of which are operable by said arm as said control rod moves axially, whereby axial movement of said control rod actuates said servocontrol mechanism to move said operation member rotationally and rotation of said control member moves said operation member axially.

2. A transmission control comprising a gear control rod movable axially and rotatable about its axis, an arm rigidly connected to said control rod and extending radially therefrom, a ball fixed to the free end of said arm, a gear-coupling operation member, a crank having one leg fixed to an end of said operation member extending at right angles thereto and a second leg extending parallel to said operation member, an elliptical seat formed on the end of the leg of said crank parallel to said operation member for accommodating said ball, the major axis of said elliptical seat being parallel to the axis of said control rod, a servocontrol mechanism having a cylinder parallel to the axis of said control rod and having a plunger therein, and a seat rigidly carried by said plunger for accommodating said elliptical seat at the ends of its major axis while leaving clearances beyond the ends of the minor axes of said elliptical seat, whereby rotation of said control rod moves said ball, said elliptical seat and said crank to move said operation member axially, and axial movement of said control rod moves said ball and said crank to rotate said operation member.

3. A transmission control according to claim 2 wherein a resilient setting device engages said control rod radially of its axis to position said ball in a middle position in said elliptical seat.

4. A transmission control according to claim 2, wherein a pressure distributor is positioned in each end of the plunger of said servocontrol mechanism, a valve controls operation of each pressure distributor, and a push rod is connected to each valve engageable with said arm upon axial movement of said control rod, whereby movement of said arm to bring said ball to one end of the major axis of its seat opens one of said valves to actuate said servocontrol for moving the free end of said crank in a direction parallel to the axis of said control rod.

5. A transmission control according to claim 4, wherein each air distributor has a pressure chamber, a pipe connects the pressure chambers, a fixed pipe is connected with a source of pressure, and a feed pipe movable with said plunger in sealed relation with said fixed pipe is connected to one of said pressure chambers.

6. A transmission control comprising a control rod movable axially and rotationally about its axis, an arm rigidly connected to said control rod and extending radially therefrom, a gear coupling operation member movable axially and rotationally about its axis, a crank having one leg fixed to an end of said operation member extending at right angles thereto and the other leg extending parallel to said operation member, and a connection between the leg of said crank parallel to said operation member and the free end of said arm pivoting said crank to said arm parallel to the axis of said operation member and connecting said crank to said arm with limited play parallel to the axis of said control rod, in combination with a servocontrol mechanism operable in a direction parallel to the axis of said control rod to move said connection in like direction, said mechanism having valves the stems of which are operable by said arm as said control rod is moved axially, whereby axial movement of said control rod actuates said servocontrol mechanism to move said operation member rotationally and rotation of said control member moves said operation member axially.

References Cited in the file of this patent
UNITED STATES PATENTS

| | | |
|---|---|---|
| 2,303,937 | Clayton et al. | Dec. 1, 1942 |
| 2,323,878 | Kesling | July 6, 1943 |
| 2,451,160 | Eaton | Oct. 12, 1948 |
| 2,520,734 | Price | Aug. 29, 1950 |
| 2,819,626 | Stump | Jan. 14, 1958 |